United States Patent [19]
Sillitto et al.

[11] Patent Number: 5,235,405
[45] Date of Patent: Aug. 10, 1993

[54] DETECTOR APPARATUS FOR DETECING COHERENT MONOHROMATIC POINT-SOURCE RADIATION

[75] Inventors: Hillary G. Sillitto; John C. Parker, both of Edinburgh, Scotland

[73] Assignee: GEC Ferranti Defence Systems Limited, Stanmore, England

[21] Appl. No.: 732,634

[22] Filed: Feb. 13, 1985

[30] Foreign Application Priority Data

Feb. 18, 1984 [GB] United Kingdom ............... 8404319

[51] Int. Cl.[5] ........................ G01B 9/02; G01B 11/14
[52] U.S. Cl. .................................. 356/354; 356/352; 356/346; 356/374
[58] Field of Search ................ 356/346, 352, 354, 374

[56] References Cited

U.S. PATENT DOCUMENTS

| | | | |
|---|---|---|---|
| 4,222,667 | 9/1980 | Layne | 356/346 |
| 4,242,000 | 12/1980 | Bergkvist | 356/374 |
| 4,309,108 | 1/1982 | Siebert | 356/352 |
| 4,355,898 | 10/1982 | Dakin | 356/354 |
| 4,515,478 | 5/1985 | Ballard et al. | 356/346 |

OTHER PUBLICATIONS

H. A. Hill et al., Appl Optics, vol. 16, No. 1, Jan. 1977, p. 195.

K. Patorski et al., Appl. Optics, vol. 15, No. 5, May 1976, p. 1234.

*Primary Examiner*—Stephen C. Buczinski
*Attorney, Agent, or Firm*—Kerkam, Stowell, Kondracki & Clarke

[57] ABSTRACT

Detector apparatus includes a dispersive prism (10) and a diffraction grating (11) of the type which produces only zero and first order diffraction patterns. Located behind the diffraction grating (11) so as to interact with the first harmonic content of the diffraction patterns is a Moire grating (12) having half the pitch of the diffraction grating (11). Detector means including at least two pairs of detectors (13–16) is located behind the Moire grating (12) to detect the presence of Moire fringes.

12 Claims, 2 Drawing Sheets

DETECTOR APPARATUS FOR DETECING COHERENT MONOHROMATIC POINT-SOURCE RADIATION

Coherent and compact sources of radiation in the form of lasers are being used increasingly, particularly in military applications, for the "designation" of an object or target or for range-finding. To do this, radiation from a laser is directed at the target, and a proportion of that incident radiation is scattered and may be detected by a suitable laser receiver. In a military application it is likely that a target will be so identified for the purpose of attack. It is therefore highly desirable from the defensive point of view that a potential target should receive warning of its designation. It is equally important that any warning system should not produce too many false warnings triggered by other forms of light source, or by nearby regions being illuminated by a laser not pointed directly at the target.

The beam of radiation from a laser has several characteristics which will tend to distinguish it from other forms of light source. Laser radiation will almost certainly be more intense than that from other artificial sources, and the source is usually very small. In addition laser radiation is coherent. Our copending application Sillitto U.S. Ser. No. 699,135, filed Dec. 18, 1984 is concerned with detecting only coherent point source radiation. It has become apparent, however, that sources other than lasers may produce spatially coherent radiation which may cause erroneous results. High intensity flash sources may produce spatially coherent radiation, but it is essentially white or at least broadband radiation, as distinct from the monochromatic radiation produced by a laser.

It is an object of the invention to provide detector apparatus for detecting point-source, spatially coherent laser radiation over a range of wavelength.

According to the present invention there is provided detector apparatus for detecting laser radiation, which includes a diffraction grating arranged to receive incident radiation and to provide only zero and first order diffraction patterns, a Moire grating located behind the diffraction grating and having a pitch half of that of the diffraction grating, the Moire grating being arranged to interact with a diffraction pattern resulting from the incidence of spatially coherent radiation on the diffraction grating to produce a Moire fringe pattern, and detector means operable to detect the presence of such a Moire fringe pattern.

A particular embodiment of the invention includes a dispersive element responsive to radiation from a field of view to provide a single output beam incident upon the diffraction grating.

The invention will now be described with reference to the accompanying drawings, in which.

Radiation received from a distant source incident upon a diffraction grating produces interference fringes behind the grating, the visibility of which is zero when the "wavefront shear" D is given by $$D = \frac{1.22w}{2\alpha} \quad (1)$$

where w is the wavelength of the radiation and $2\alpha$ is the full cone angle subtended by the radiation source at the grating. By way of example, if the wavelength of radiation to be detected is 1 micron, and the source subtense is 0.5 mRad, then equation 1 gives D equal to 2.44 mm.

For radiation of other wavelengths D varies in proportion to the wavelength.

Figure 1:
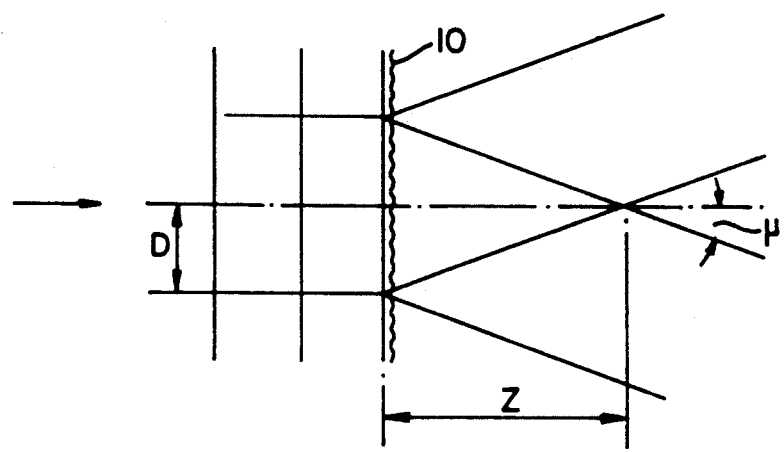
FIG. 1 illustrates the principle of operation of the diffraction grating.

FIG. 1 illustrates the production of wavefront shear using a diffraction grating 10. Incident radiation from the distant source arrives in the direction of the arrow. In passing through the grating a number of diffracted beams are produced, of different orders. Only one first order beam and the undiffracted beam will be considered. Considering the wavefront shear D, which occurs a distance Z behind the grating, and for small values of diffraction angle $\mu$, then $$D = Z\mu \quad (2)$$

Now the diffraction angle $\mu$ is given by:

$$d\sin\mu = pw \quad (3)$$

where d is the period of the grating and p is the order of the diffracted beam.

Hence $$\mu = w/d, \text{ approximately} \quad (4)$$

Substituting this in equation (2), then $$D = \frac{Zw}{d} \quad (5)$$

Comparing equations (1) and (5), it will be seen that $$D = \frac{Zw}{d} = \frac{1.22w}{2\alpha}$$

so that $Z = \frac{1.22d}{2\alpha} \quad (6)$ or $d = \frac{2\alpha Z}{1.22} \quad (7)$ Both of these are independent of the wavelength of the radiation and depend only on the angular size of the source.

The theory set out above assumed that only zero and first order fringe patterns are produced by the grating. This is achievable in practice by providing a diffraction grating having an amplitude transmission characteristic given by $$t(x) = 1 + \cos(2\pi x/p)$$
$$= 2\cos^2(\pi x/p)$$

where x is the distance along an axis in the plane of the grating and perpendicular to the grating lines, and p is the period of the grating. The interference fringes formed by the +1 and −1 orders of diffraction have twice the spatial frequency of the grating, and are present throughout the space behind the diffraction grating up to a distance Z at which the wavefront shear d from equation (7) is such as to reduce the fringe visibility to zero. The Moire grating is of twice the frequency (half the pitch) of the diffraction grating, allowing reduced but constant contrast Moire fringes to be detected for one position of the Moire grating but for any wavelength to which the detector is sensitive.

The grating is used as a shearing interferometer as described for example in "Shearing Interferometer as an interferometric filter for the reduction of scattered light". by H. A. Hill et al, published in Applied Optics Volume 16 No. 1, January 1977 at pages 195 to 199. Such a grating has the property of producing interference fringes in the self-image plane if illuminated by spatially coherent radiation.

Depending on the degree of coherence the fringes disappear at some distance behind the grating; the more spatially coherent the radiation the further behind the grating do the fringes remain detactable. Thus by setting the separation between the diffraction grating and the Moire grating one may determine the threshold of coherence which will be accepted as a "point source".

Without the dispersive element the system described above does not discriminate against broad-band radiation sources. However, the effect of placing a dispersive element in front of the diffraction grating is to smear-out the fringes produced by the diffraction grating so that no clearly-defined interference fringe pattern is produced This may be achieved if the dispersive element causes the radiation source to appear to have an angular subtense greater than say, 0.5 mRad. The dispersive element must be one which produces only a single beam of radiation from the radiation incident upon it. Most conveniently the dispersive element may be a prism, and it can be shown that adequate dispersion for radiation having a wavelength in the range 1014 to 1064 nm is provided by a prism having an apex angle of the order of 20°. If the apex angle is increased then so is the wavelength discrimination. Clearly, however, size and field of view constraints place a limit on the apex angle of the prism.

Figure 2:
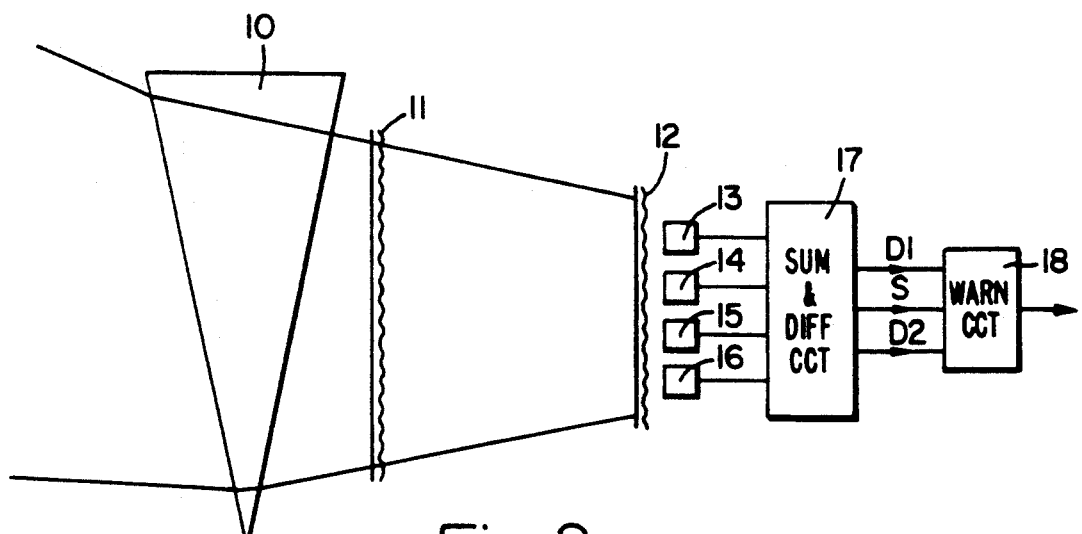
FIG. 2 is a schematic diagram of the apparatus according to a first embodiment.

FIG. 2 shows a schematic diagram of a detector according to one embodiment of the invention. Referring now to FIG. 2, radiation from a field of view falls on a dispersing prism 10. The radiation emerging from the prism 10 falls on a diffraction grating 11 having the characteristics defined above, namely that it produces only zero and first order diffracted beams. A Moire grating 12 is placed behind the diffraction grating 11 and, as already stated, has half the pitch of the diffraction grating 11. The Moire grating is arranged in the usual manner with the grating lines slightly skew with respect to the diffraction pattern, so that Moire fringes are produced The second harmonic component of the interference fringe has uniform intensity at all distances from the grating, and hence the spacing between the diffraction grating 11 and the Moire grating 12 is not determined by any consideration except the limitations which it places on the angular threshold to be detected by the apparatus.

Behind the Moire grating 12 is located the detector means. In its simplest form this consists of four radiation-sensitive detectors 13 to 16 positioned to detect different portions of a cycle of the Moire fringe pattern. The four detectors have their electrical outputs connected to a circuit 17 which provides three electrical signals. These include a first signal D1 representing the difference between the outputs of detectors 13 and 15, and a second signal D2 representing the difference between the outputs of detectors 14 and 16. The third signal is a signal S representing the sum of the outputs of all four detectors. Suitable warning circuitry 18 is provided to give an alarm when either or both of signals D1 and D2 vary by more than, say, 10/ compared with the mean signal S/4.

The dispersive prism 10 may be omitted if broadband sources are not likely to be present or where they are required to cause an alarm indicator in the same manner as a laser source.

As already stated, the field of view of the apparatus described above depends upon the physical arrangement of the elements making up the apparatus. No optical system is used, and hence a wide field of view of, say 60°, is possible.

Figure 3:
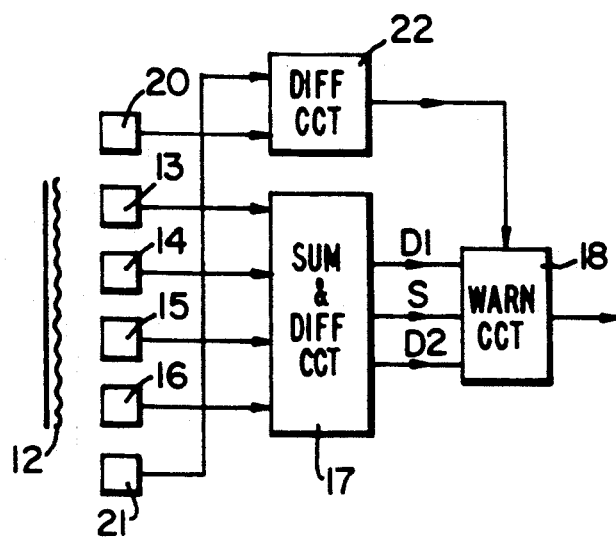
FIG. 3 is a schematic diagram of part of the apparatus according to a second embodiment.

There is a possible problem if the source of radiation is located at the edge of the field of view. In such a case it is possible that only part of the detector array will be illuminated, and this would cause a difference signal output regardless of the size and nature of the source. FIG. 3 illustrates schematically how this problem may be avoided. This requires the use of two further detectors 20 and 21 located one at each end of the detector array. The outputs of these are connected to a difference circuit 22 which provides an output only if the outputs of detector 20 and 21 are different. Such a difference will indicate that one detector is illuminated more than the other, and hence that the radiation source is at the edge of the field of view. The output of circuit 22 is used to inhibit the warning circuit 18 so that no alarm is given under these circumstances.

Other methods of detecting sources located at the edge of the field of view may be used. The field of view of the apparatus may be increased by combining a number of detector apparatus of the type described—for example six would provide all-round coverage.

Figure 4:
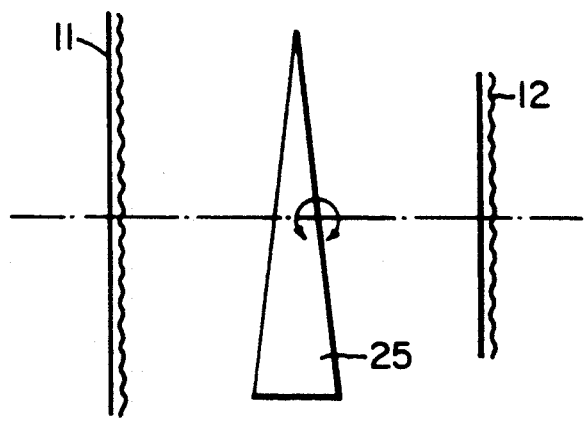
FIG. 4. and 5 illustrate means for modulating the received radiation.

The invention described above operates on the basic principle that any very intense point source of radiation with narrow spectral width is likely to be a laser. Larger intense sources, such as the sun for example, will produce only low contrast fringes which will not give rise to the alarm condition. The processing circuitry may also be tuned to detect pulses of radiation with duration characteristics of lasers (e.g. of the order of 20 nanoseconds for most rangefinders). Alternatively, or in addition, optical modulation may be introduced in order to modulate CW laser illumination. This may be done on a number of ways involving mechanically movable optical elements For example the interference fringe pattern may be caused to scan across the Moire fringe grating by moving the diffraction grating in its own plane at right angles to the direction of the rulings forming the grating. Alternatively the diffraction grating may be kept stationery and the Moire grating itself moved in its own plane at right angles to its rulings. Other methods involve the inclusion of additional optical element between the two gratings, with means for moving these. As shown, for example, in FIG. 4, a wedge-shaped prism 25 may be used, rotatable about the optical axis of the two gratings. The extent of movement of the interference fringe pattern depends upon the apex angle of the wedge, whilst the modulation frequency depends upon the rate of rotation of the wedge.

Figure 5:
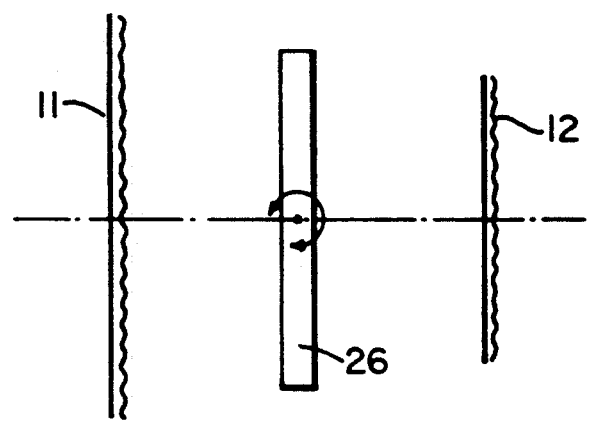

An alternative arrangement is shown in FIG. 5, where a glass plate 26 is placed between the two gratings and caused to rock about an axis perpendicular to the optical axis. In another arrangement the glass plate may be replaced by a mirror which directs the interference fringe pattern on to the Moire grating. The mirror, like the glass plate, is caused to rock about an axis perpendicular to the optical axis. In yet another arrangement the rocking mirror could be placed in front of the diffraction grating so as to deflect incident radiation from the field of view on to the diffraction grating. Other means for modulating the radiation may be used, not necessarily using movable optical elements.

Clearly if modulation is applied to detect CW radiation as described above, the circuitry 17 of FIG. 3 will have to include means for demodulating the electrical signals received from the radiation sensitive detectors. A major purpose of the invention is to distinguish between a direct attack in which a laser is pointed at or very close to the detector, and radiation received by way of ground scatter from some region being illuminated by the laser not aimed at or close to the detector.

What we claim is:

1. Detector apparatus for detecting laser radiation, which includes:
    a diffraction grating arranged to receive incident radiation and to provide only zero and first order diffracted beams,
    a dispersive element capable of receiving incident radiation from a field of view to provide a single output beam incident upon the diffraction grating,
    a Moire grating located behind the diffraction grating and having a pitch half of that of the diffraction grating, the Moire grating being arranged to interact with a diffraction pattern resulting from the incident of spatially coherent radiation of the diffraction grating to produce a Moire fringe pattern, and
    detector means operable to detect the presence of such a Moire fringe pattern.

2. Apparatus as claimed in claim 1 in which the dispersive element is a prism.

3. Apparatus as claimed in claim 1 in which the detector means includes at least two pairs of radiation-sensitive detectors arranged effectively in a linear array.

4. Apparatus as claimed in claim 3 in which the detector means includes circuit means responsive to the outputs of the detector to provide signals indicating the difference between the outputs of each of the alternate pairs of detectors and a third signal representing the mean output of all the detectors.

5. Apparatus as claimed in claim 4 in which the detector means includes an alarm circuit operable to provide an alarm signal if either of the difference signals varies relative to the mean output by more than a predetermined amount.

6. Apparatus as claimed in claim 3 in which the detector means includes a third pair of radiation-sensitive detectors located one at each end of the said linear array and circuit means operable to detect any difference between the outputs of the two detectors of the pair.

7. Apparatus as claimed in claim 1 which includes modulating means operable to modulate the radiation incident upon the detector means.

8. Apparatus as claimed in claim 7 in which the modulating means includes means for repeatedly moving the diffraction grating in its own plane perpendicular to the rulings forming the diffraction grating.

9. Apparatus as claimed in claim 7 in which the modulating means includes means for repeatedly moving the Moire grating in its own plane perpendicular to the rulings forming the Moire grating.

10. Apparatus as claimed in claim 7 in which the modulating means includes a movable optical element located between the diffraction grating and the Moire grating.

11. Apparatus as claimed in claim 10 in which the modulating means includes a wedge-shaped prism rotatable about the optical axis joining the diffraction grating and the Moire grating.

12. Apparatus as claimed in claim 10 in which the modulating means includes an element arranged to deflect the path of the radiation passing from the diffraction grating to the Moire grating and rotatable through a limited angle about an axis perpendicular to the optical axis joining the diffraction grating and the Moire grating.

* * * * *

UNITED STATES PATENT AND TRADEMARK OFFICE
CERTIFICATE OF CORRECTION

PATENT NO.   :   5,235,405
DATED        :   August 10, 1993
INVENTOR(S)  :   Sillitto et al It is certified that error appears in the above-identified patent and that said Letters Patent is hereby corrected as shown below:

On the title page, item [54] lines 1 and 2, and in column 1, lines 2 and 3, change "DETECING" to --DETECTING--; and change "MONOHROMATIC" to --MONOCHROMATIC--.

Column 5, line 31, (Claim 1, line 13), change "incident" to -- incidence --.

Signed and Sealed this

Fifth Day of April, 1994

*Attest:*

BRUCE LEHMAN

*Attesting Officer*          *Commissioner of Patents and Trademarks*